United States Patent Office 3,493,889
Patented Feb. 3, 1970

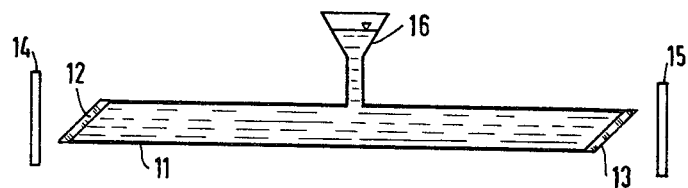
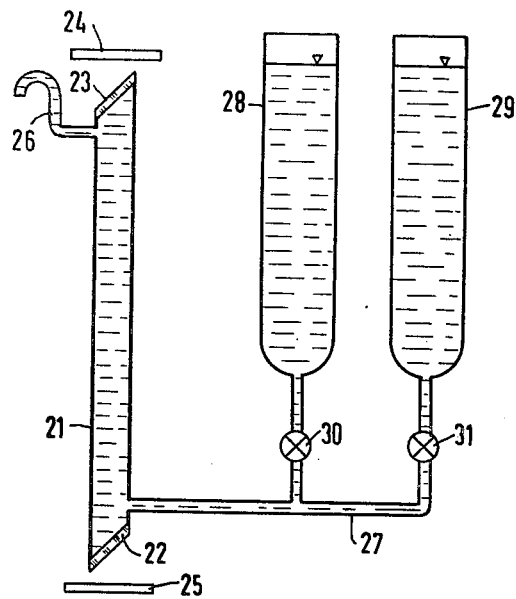

3,493,889
CHEMICALLY PUMPED LASER DEVICE
Hans-Joachim Henkel, Erlangen, Germany, assignor to Siemens Aktiengesellschaft, Erlangen, Germany, a corporation of Germany
Filed Apr. 20, 1965, Ser. No. 449,416
Claims priority, application Germany, Apr. 21, 1964,
S 9,064
Int. Cl. H01s 3/09
U.S. Cl. 331—94.5                         5 Claims

ABSTRACT OF THE DISCLOSURE

A laser device comprises an optical resonator having a liquid which contains a chemiluminescent oxidative substance in solution, or a complex compound having an oxidative substance and a fluorescigenic ion, or a oxidative substance and a compound of a fluorescigenic ion in solution. An oxidizing agent is added to the liquid for oxidizing the chemiluminescent oxidative substance to release the oxidation energy of the laser beam.

DESCRIPTION OF THE INVENTION

My invention relates to sources of coherent radiation of visible, infrared or ultraviolet frequencies, operating on the principle of stimulated or induced emission. For operating such sources, called lasers, a fluorescigenic or laser-active substance must be supplied with excitation energy in such a quantity that the number of the excited electrons exceeds the number of the electrons in the ground state or end state of the fluorescent energy band. Accordingly, each particular laser system has a characteristic threshold value for the supplied excitation energy, above which threshold a laser operation is possible. It is further necessary to place the fluorescent or laser-active substance into a suitable optical resonator system which in most cases is formed by two planar-parallel reflective surfaces jointly constituting a kind of Perot-Fabry interferometer.

Since discovery of the ruby laser by Maiman in 1960, a large number of other laser types have become known, namely solid-state lasers, gas lasers, semiconductor diode lasers and liquid lasers. In this respect, reference may be had for example to the article series "Lasers" published in Electronics, Oct. 27, 1961, pages 39 to 47; Nov. 3, 1961, pages 40 to 44; Nov. 10, 1961, pages 81 to 86; Nov. 24, 1961, pages 54 to 62; Dec. 6, 1963, pages 61 to 66. Reference may also be had to the book by M. Brotherton "Masers and Lasers" McGraw-Hill Book Company.

The various types of lasers differ not only by the laser-active substances employed but also by the manner in which the energy required for laser operation is supplied. For example, this so-called pumping energy is supplied to a diode laser by directly injecting electrical energy into a p-n junction, to a solid-state laser or fluid laser by radiating light into the laser. As a rule, a flash lamp is used as a light source. However, there are also known laser devices in which, instead of a lamp, a vessel filled with explosive substance is provided, and the light evolving from the explosion is used for exciting the laser radiation (Electronics, Jan. 17, 1964, pages 48 to 51).

Lasers pumped by supply of light have a very poor efficiency which in most cases is less than 1%. Very intensive light sources must therefore be used. In most cases, a gas discharge lamp is required which can issue the necessary lighting energy only in form of short light flashes. For that reason, most optically pumped lasers permit only a pulse-type operation, the maximal pulse duration being about 1 millisecond. Heretofore a continuous operation of solid-state lasers with arc lamps has been attained only with few, particularly favorable laser systems. So far, a continuous operation has not been achieved with liquid lasers. Generally, the considerable amount of equipment and space required for supplying excitation energy by irradiation with light is a notable disadvantage.

It is an object of my invention to avoid or minimize the shortcomings of the known laser devices.

Another object of the invention is to devise a laser device capable of continuous operation with a fluid laser-active medium.

According to the invention, I provide within the space of an optical resonator a chemically reactive, liquid or gaseous laser substance and employ the energy released by the chemical reaction of this substance for the exciation of laser radiation within the substance. Suitable chemical reactions for this purpose are especially the oxidation reactions of organic compounds. The chemically reacting laser fluid itself may be laser-active so as to emit the excited laser radiation, or it may be mixed with the laser-radiative substance proper.

The invention will be further described with reference to embodiments of laser devices according to the invention illustrated schematically and by way of example on the accompanying drawings, in which:

FIG. 1 illustrates a laser device for intermittent operation;

FIG. 2 shows a laser device for continuous operation; and

Figure 3:
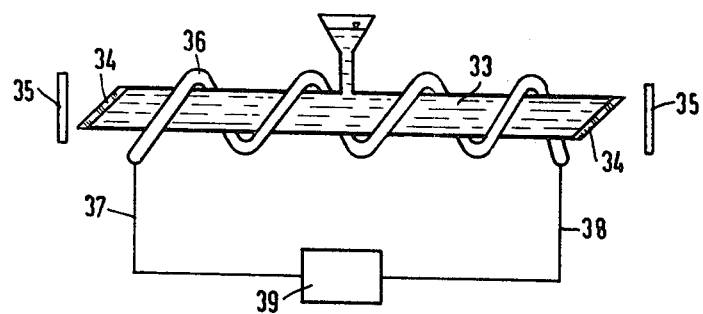
FIGS. 3 and 4 show two different laser devices for pulsating operation.

The laser device according to the invention can be given a particularly simple design if the chosen laser substance itself is capable of emitting light when subjected to a suitable chemical reaction. This emission phenomenon is known as "chemiluminescence." Such reactions, for example, are the oxidation of 3-amino-phthalic acid hydrazide (Luminol) or the oxidation of aminosiloxenes.

The device illustrated in FIG. 1 is an example of a laser device operation with such a liquid laser substance. The device comprises a glass tube 11 for receiving the laser liquid. The tube 11 is closed at both ends by planar parallel glass plates 12 and 13 which preferably extend at an inclination to the tube axis in accordance with the "Brewster angle." As a result, the reflection losses at these panes are very slight. The glass tube 11 is located between the two parallel mirrors 14 and 15 so that the arrangement constitutes an optical resonator. Also applicable is a confocal mirror arrangement.

A funnel 16 permits filling the tube 11 with the laser liquid. This liquid may consist, for example, of a solution of 1 g. Luminol and 2.5 g. sodium hydroxide in 1 liter water. Shortly before commencing the operation of the laser, 5 cm.$^3$ of a 30% hydrogen peroxide solution to act as an oxidation medium are added per 100 cm.$^3$ of solution. The liquid is well stirred and filled into the laser tube which, for example, may have a length of 20 cm. and an inner diameter of 1 cm. The laser then radiates light of the frequency characteristic of Luminol. The energy released by the oxidation of the Luminol acts as the pumping energy.

Such a chemically pumped laser operates continuously for the duration of the reaction and becomes extinguished after a few minutes when the oxidizable substance is consumed.

A laser device according to the invention may also be designed for continuous operation during any desired length of time. For this purpose, it is necessary to continuously remove the spent liquid while replenishing it by new solution composed of oxidizable substance and oxidizing medium. The embodiment shown in FIG. 2 exemplifies a continuous-operation laser of this kind.

As shown in FIG. 2, a laser tube 21, closed by planar parallel glass plates 22 and 23, is mounted between two mirrors 24 and 25. Fused to the laser tube 21 near the respective two ends are respective glass tubes 26 and 27. The tube 27 is connected with two vessels 28 and 29. The vessel 28 contains fresh oxidizable liquid capable of fluorescence. The vessel 29 contains oxidation medium. The fresh, oxidizable laser liquid and the oxidant are continuously supplied through pipe 27 into the laser tube 21. The rates of supply for the two substances are adjustable or regulatable with the aid of respective valves 30 and 31. The consumed laser liquid issues continuously through the overflow tube 26 which is curved upwardly and extends up to such a height that the liquid always fills the entire laser tube 21.

In laser devices according to the invention, the threshold energy for initiating the laser emission can be reduced by conevrting, prior to the reaction, the oxidizable substance to a complex compound having a fluorescigenic ion. Such conversion of the oxidizable substance is effected, for example, with a chromium ion which is given a triple positive charge, or with ions of the rare earths. The reaction energy is then transmitted from the reacting complexligand to the fluorescigenic ion. The light emitted in this case does not have a wave length characteristic of the oxidizable substance but has a wave length which is characteristic of the fluorescent radiation of the added ion. The oxidizable molecule portion of the complex compound in such a device need not in itself be chemiluminescent. A suitable compound, for example, is the europium complex of Luminol. When using this complex compound as laser substance, the emitted laser light has a wave length of approximately 6100 A.

Laser devices according to the invention may also be provided with a laser liquid formed of a solution which, aside from the oxidizable substance, contains another compound of the fluorescigenic ion, for example, europiumtribenzoyl-acetonate which is known as laser-active substance. Such a laser liquid does not contain a complex compound of oxidizable molecules and fluorescigenic ions. The oxidizable molecules and the fluorescigenic ions rather are built into two different compounds respectively. It sems that the reaction energy released by the oxidation of the oxidizable molecules is transmitted by collision processes to the fluorescent molecules. In this case it is likewise not necessary that the oxidizable molecules themselves be capable of chemiluminescence. Such a laser device has the advantage that optimal operating conditions are adjustable by the choice of suitable concentrations. Thus, laser liquids of particularly low threshold values are obtained if the ratio of the concentration of the oxidizable molecules to the concentration of the fluorescigenic molecules is very large, for example about 10:1 up to about 1000:1.

The use of energy released by chemical reactions, for the excitation of laser radiation, is not limited to liquid laser substances. Gas lasers may also be pumped chemically in accordance with the invention. Thus, for example, the reaction of gaseous sodium with chlorine gas results in the laser emission of yellow sodium light. This is applicable, for example, by introducing chlorine gas into a laser tube filled with sodium vapor. Preferably employed instead of pure sodium, which must be vaporized by heating, is a more readily vaporizable sodium compound. Examples of suitable compounds of this type are sodium-amide ($NaNH_2$) which vaporizes at about 400° C., and sodium carbide ($Na_2C_2$) which vaporizes at about 700° C. In contrast thereto, sodium vaporizes at 880° C. In each case, the processing temperature should be somewhat above the vaporizing temperature. When using sodium vapor, the required high temperature makes it advisable to use quartz as material for the laser tube.

By coupling optical and chemical energy, a laser device according to the invention is advantageously applicable in pulsating operation. For this purpose the chemical energy is given such a dosage, for example by diluting the oxidizing medium, that the laser system is excited up to closely below the threshold value for coherent emission of radiation, and the required residual amount of energy is supplied by light flashes. The laser liquids used for such pulsating operation may correspond to those described above. For example, there may be used a solution of 1 g. Luminol and 2.5 g. sodium hydroxide in 1 liter of water. However, in lieu of 5 cm.$^3$ of 30% hydrogenperoxide solution, only 1 cm.$^3$ of the latter solution is added per 100 cm.$^3$ of solution for pulsating operation. Hence, for pulsating operation the oxidant is diluted in the ratio 5:1 relative to continuous operation.

The above-mentioned flashes of light are applied in the same manner as in the known ruby lasers such as by helical flash lamps surrounding the laser tube, or by a rod-shaped flash lamp mounted together with the laser tube in the focal space of an elliptical mirror. Since in this case the required amount of optical energy is considerably less than when optical energy is exclusively employed for excitation, much faster flash sequences become applicable.

Figure 4:
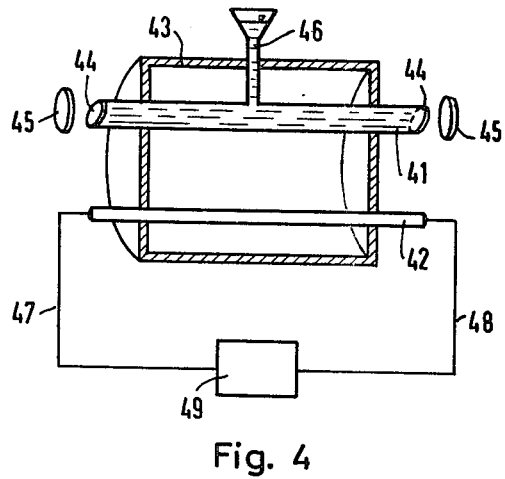

Combined optical-chemical lasers embodying the features just described are illustrated in FIGS. 3 and 4. According to FIG. 3, a laser tube 33 closed at both ends by planar parallel glass plates 34 as described above with reference to FIG. 1 is surrounded by a helical flash lamp 36. The electrodes at the respective ends of the flash lamp are connected by electric leads 37 and 38 with a voltage source 39 which furnishes the voltage pulses for producing the light flashes. The tube 33 is located between the planar parallel reflectors 35 of the optical resonator.

The laser device shown in FIG. 4 is equipped with a rod-shaped flash lamp and an elliptical reflector. The laser tube 41 and the rod-shaped flash lamp 42 are mounted on the respective focal axes of the elliptical reflector 43 shown in section. The laser tube 41 is closed at both ends by glass plates 44. Two planar parallel reflectors 45 form the optical resonator. The funnel 46 for supplying the laser liquid extends from the interior of the elliptical reflector 43 to the outside. The electrodes of the flash lamp 42 are connected by leads 47 and 48 with a voltage source 49 which supplies the voltage pulses for producing the light flashes.

I claim:
1. A laser device for producing a laser beam, said device comprising an optical resonator having a liquid containing a chemiluminescent oxidative substance in solution, said chemiluminescent oxidative substance comprising 3-aminophthalic acid hydrazite, and an oxidizing agent added to said liquid for oxidizing said chemiluminescent oxidative substance to release the excitation energy of the laser beam.

2. A laser device for producing a laser beam, said device comprising an optical resonator having a liquid containing a chemiluminescent, oxidative substance in solution, said optical resonator having a hydrous solution of 3-aminophthalic acid hydrazite and sodium hydroxide, and an oxidizing agent added to said liquid for oxidizing said chemiluminescent oxidative substance to release the excitation energy of the laser beam, said oxidizing agent comprising hydrogen peroxide added to said solution.

3. A laser device for producing a laser beam, said device comprising an optical resonator having a liquid containing a chemiluminescent oxidative substance in solution, said optical resonator having a hydrous solution of one gram of 3-aminophthalic acid hydrazite and 2.5 grams of sodium hydroxide per one liter of water, and an oxidizing agent added to said liquid for oxidizing said chemiluminescent oxidative substance to release the excitation energy of the laser beam, said oxidizing agent comprising 5 cm.³ of a 30% hydrogen peroxide solution added per 100 cm.³ of said solution.

4. A laser device for producing a laser beam, said device comprising an optical resonator having a liquid containing a chemiluminescent oxidative substance in solution, said optical resonator having a hydrous solution of one gram of 3-aminophthalic acid hydrazite and 2.5 grams of sodium hydroxide per one liter of water, an oxidizing agent added to said liquid for oxidizing said chemiluminescent oxidative substance to release the excitation energy of the laser beam, said oxidizing agent comprising one cm.³ of a 30% hydrozen peroxide solution added per 100 cm.³ of said solution, and means for subjecting said solution to light flashes as additional excitation energy of the laser beam.

5. A laser device for producing a laser beam, said device comprising an optical resonator having a liquid containing a complex compound having an oxidative substance and a fluorescigenic ion, said complex compound comprising 3-aminophthalic acid hydrazite and an ion of europium, and an oxidizing agent added to said liquid for oxidizing said oxidative substance to release the excitation energy of the laser beam.

References Cited

UNITED STATES PATENTS 3,302,127    1/1967    Shao-Chi Lin _____ 331—94.5

OTHER REFERENCES

Barger et al.: "Optical Detection of Microwave Transitions in Electronically Excited CN Produced by a Chemical Reaction," Phys. Rev. Lett., vol. 9, pp. 345–47, Oct. 15, 1962.

Polanyi: "Proposal for an Infrared Maser Dependent on Vibrational Excitation," J. Chem. Phys., vol. 34, pp. 347–48, January 1961.

JEWELL H. PEDERSEN, Primary Examiner

E. BAUER, Assistant Examiner

U.S. Cl. X.R.

252—188.3, 301.2

PO-1050
(5/69)

UNITED STATES PATENT OFFICE
CERTIFICATE OF CORRECTION

Patent No. 3,493,889　　　　　　　　Dated February 3, 1970

Inventor(s)　　　　Hans Joachim Henkel

It is certified that error appears in the above-identified patent and that said Letters Patent are hereby corrected as shown below:

In the heading to the printed specification, line 8, "S 9,064" should read --S 90,647--.

Signed and sealed this 14th day of July 1970.

(SEAL)
Attest:

Edward M. Fletcher, Jr.
Attesting Officer

WILLIAM E. SCHUYLER, JR.
Commissioner of Patents